(12) United States Patent
Ouyang

(10) Patent No.: US 12,316,401 B2
(45) Date of Patent: May 27, 2025

(54) CONNECTING METHOD, APPARATUS OF SCREEN TRANSMISSION DEVICE BASED ON NFC, AND COMPUTER DEVICE

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Yuji Ouyang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 359 days.

(21) Appl. No.: 17/984,946

(22) Filed: Nov. 10, 2022

(65) Prior Publication Data

US 2023/0073492 A1 Mar. 9, 2023

Related U.S. Application Data

(63) Continuation of application No. PCT/CN2022/098886, filed on Jun. 15, 2022.

(30) Foreign Application Priority Data

Jun. 23, 2021 (CN) .......................... 202110700036.0

(51) Int. Cl.
*H04B 5/77* (2024.01)
*G06K 7/00* (2006.01)
(Continued)

(52) U.S. Cl.
CPC ............. *H04B 5/77* (2024.01); *G06K 7/0034* (2013.01); *H04B 5/24* (2024.01); *H04B 5/72* (2024.01)

(58) Field of Classification Search
CPC ... H04B 5/77; H04B 5/72; H04B 5/24; H04B 5/20; H04B 5/70; G06K 7/0034;
(Continued)

(56) References Cited

U.S. PATENT DOCUMENTS 11,240,671 B1\* 2/2022 Huang ................... H04W 76/14
2014/0065960 A1\* 3/2014 Gang ....................... H04B 5/00
455/41.1
(Continued)

FOREIGN PATENT DOCUMENTS

CN 103546203 A 1/2014
CN 103559516 A 2/2014
(Continued)

OTHER PUBLICATIONS

First Office Action issued in corresponding CN Patent Application No. 202110700036.0, dated Jan. 19, 2023, 9 pages.
(Continued)

*Primary Examiner* — Nizar N Sivji
(74) *Attorney, Agent, or Firm* — BAYES PLLC

(57) ABSTRACT

A connecting method, apparatus of a screen transmission device based on NFC, and a computer device are provided. The connecting method of the screen transmission device based on NFC includes touching an NFC tag, and identifying whether the NFC tag contains network information of the screen transmission device; and when the NFC tag contains the network information of the screen transmission device, acquiring the network information, and connecting with the screen transmission device according to the network information.

12 Claims, 3 Drawing Sheets

(51) Int. Cl.
  *H04B 5/24* (2024.01)
  *H04B 5/72* (2024.01)
(58) Field of Classification Search
  CPC ...... Y02D 30/70; H04N 1/00; H04N 21/4227; H04N 1/00018; H04N 1/00114; H04W 76/10; H04W 12/03
  See application file for complete search history.

(56) References Cited

U.S. PATENT DOCUMENTS

| | | | | |
|---|---|---|---|---|
| 2014/0141721 | A1* | 5/2014 | Kim | H04M 1/72412 455/41.2 |
| 2015/0208245 | A1* | 7/2015 | Robinton | H04B 5/72 455/411 |
| 2016/0174119 | A1* | 6/2016 | Goto | H04W 76/10 370/331 |
| 2018/0098217 | A1* | 4/2018 | Takeuchi | H04W 4/80 |
| 2022/0164804 | A1* | 5/2022 | Friedman Ashkenazi | G06F 21/44 |
| 2022/0256321 | A1* | 8/2022 | Chen | H04W 4/80 |
| 2022/0353571 | A1* | 11/2022 | Wang | H04N 21/43637 |

FOREIGN PATENT DOCUMENTS

| | | | |
|---|---|---|---|
| CN | 103914672 | A | 7/2014 |
| CN | 104639975 | A | 5/2015 |
| CN | 105163174 | A | 12/2015 |
| CN | 110401583 | A | 11/2019 |
| CN | 110958475 | A | 4/2020 |
| CN | 111061447 | A | 4/2020 |
| CN | 111240620 | A | 6/2020 |
| CN | 111459433 | A | 7/2020 |
| CN | 111669644 | A | 9/2020 |
| CN | 111831247 | A | 10/2020 |
| CN | 112312366 | A | 2/2021 |
| CN | 112351322 | A | 2/2021 |
| CN | 112788581 | A | 5/2021 |
| JP | 2007166538 | A * | 6/2007 |

OTHER PUBLICATIONS

Second Office Action issued in corresponding CN Patent Application No. 202110700036.0, dated Mar. 24, 2023, 7 pages.

* cited by examiner

CONNECTING METHOD, APPARATUS OF SCREEN TRANSMISSION DEVICE BASED ON NFC, AND COMPUTER DEVICE

CROSS-REFERENCE TO RELATED APPLICATIONS

The present application is a continuation of International Application No. PCT/CN2022/098886, filed on Jun. 15, 2022, which claims the benefit of priority to Chinese Patent Application No. 202110700036.0, filed on Jun. 23, 2021. The entire contents of each of the above-identified applications are expressly incorporated herein by reference.

TECHNICAL FIELD

The present disclosure relates to the field of wireless communication technology, for example, a connecting method, apparatus of a screen transmission device based on Near Field Communication (NFC), and a computer device.

BACKGROUND

Currently, a connection mode between a mobile terminal and a screen transmission device is usually a connection by scanning (for example, scanning a two-dimensional code carried by a device to connect with the device) or a connection by a screen transmission code, but realization of both connection modes require the user to perform a large number of operations using the mobile terminal. For example, when the mobile terminal is connected with the device through the scanning connection, the user needs to open a camera of the mobile terminal and aim at the two-dimensional code on the device, and then perform a series of manual confirmation operations, which is very cumbersome and low convenient.

SUMMARY

The present disclosure provides a connecting method, apparatus of a screen transmission device based on NFC, and a computer device.

The present disclosure provides a connecting method of a screen transmission device based on NFC includes:
  touching an NFC tag, and identifying whether the NFC tag contains network information of the screen transmission device; and
  if the NFC tag contains the network information of the screen transmission device, acquiring the network information, and connecting with the screen transmission device according to the network information.

The present disclosure further provides a connecting apparatus of a screen transmission device based on NFC, including:
  an identifying module, configured to when an NFC tag is touched, identify whether the NFC tag contains network information of the screen transmission device; and
  a connecting module, configured to, if the NFC tag contains the network information of the screen transmission device, acquire the network information, and connect with the screen transmission device according to the network information.

The present disclosure further provides a computer device, including a memory in which a computer program is stored, and a processor. When the processor executes the computer program, the steps of any one of the above-mentioned methods are implemented.

The present disclosure further provides a computer-readable storage medium, on which a computer program is stored. When the computer program is executed by a processor, the steps of any one of the above-mentioned methods are implemented.

The present disclosure provides a connecting method, apparatus of a screen transmission device based on NFC, and a computer device. When a user touches an NFC tag by using a terminal with NFC function, the terminal system identifies whether the NFC tag contains network information of the screen transmission device. If the NFC tag contains the network information of the screen transmission device, the terminal system acquires the network information and connects with the screen transmission device according to the network information. In the present disclosure, after reading the network information of the screen transmission device through the NFC function, the terminal system directly performs wireless connection with the screen transmission device according to the network information. In the whole connection process, the user only needs to touch the NFC tag with the terminal, which is simple, convenient and rapid.

The realization, functional features, and advantages of the present disclosure will be further described with reference to the drawings in combination with the embodiments.

DETAILED DESCRIPTION

In order to make the purpose, technical solution and advantages of the present disclosure more clear, the present disclosure will be further described in detail hereinafter in combination with the drawings and embodiments. It should be understood that the embodiments described herein are only used to describe the present disclosure and are not intended to limit the present disclosure.

Figure 1:
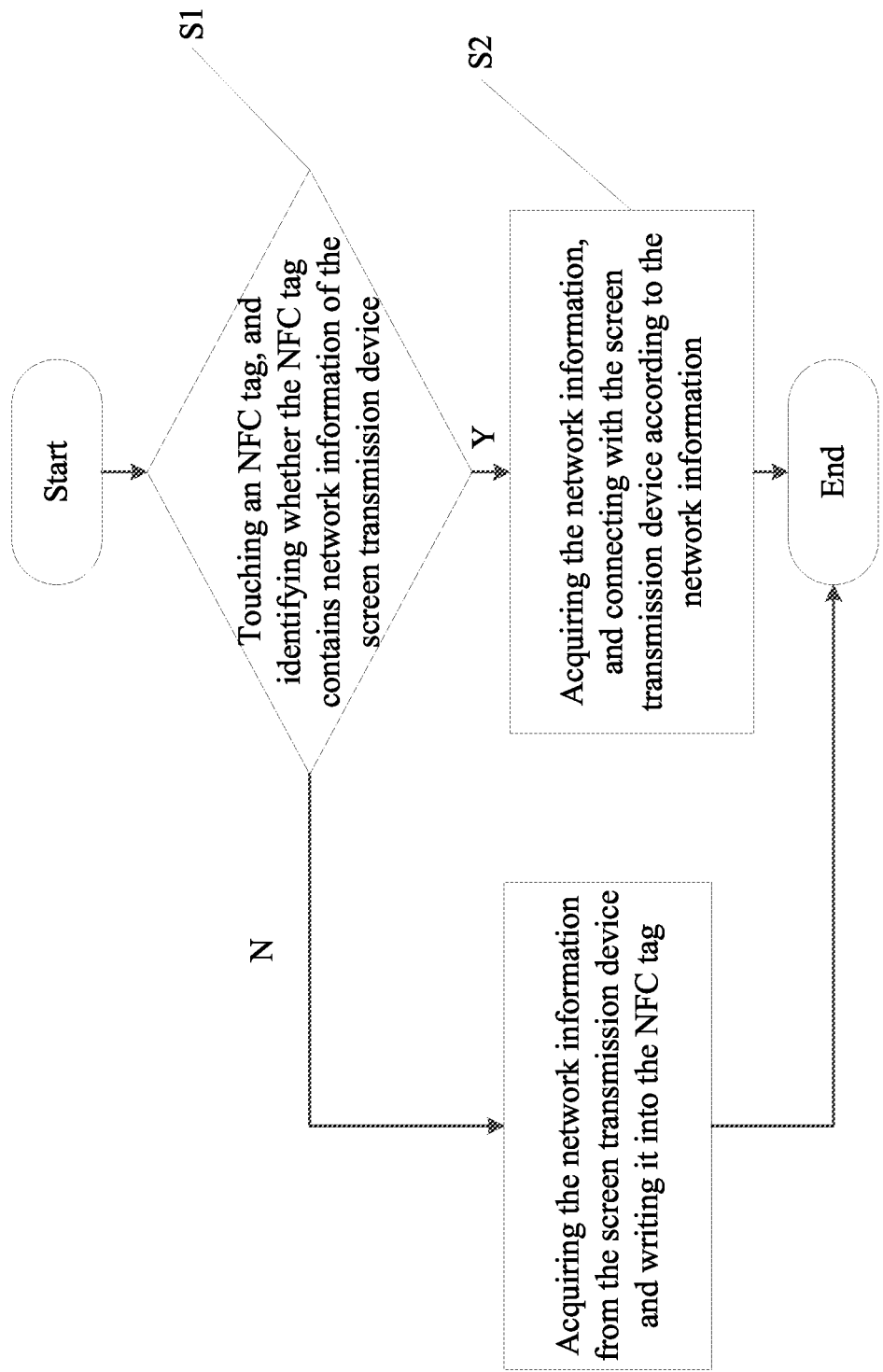
FIG. 1 is a schematic diagram of steps of a connecting method of a screen transmission device based on NFC according to an embodiment of the present disclosure.

Referring to FIG. 1, an embodiment of the present disclosure provides a connecting method of a screen transmission device based on NFC, including:
  S1, touching an NFC tag, and identifying whether the NFC tag contains network information of the screen transmission device; and
  S2, if the NFC tag contains the network information of the screen transmission device, acquiring the network information, and connecting with the screen transmission device according to the network information.

In this embodiment, an application main body of the connecting method is a terminal (such as a mobile phone, tablet computer, etc.) with Near Field Communication (NFC) function. When using, the user turns on the NFC function of the terminal and then touches the NFC tag with the terminal. The terminal system reads the data information contained in the NFC tag and determines whether the data information of the NFC tag contains the network information of the screen transmission device (such as a screen transmission box) that the terminal needs to connect currently. The network information includes characteristic information of the screen transmission device, such as Internet Protocol (IP), hot spot Service Set Identifier (SSID), and password. If identifying that the NFC tag contains the network information of the screen transmission device, the terminal system downloads the network information of the screen transmission device from the NFC tag, and wirelessly connects (for example, through Wi-Fi signals) with the screen transmission device according to the network information, so as to facilitate the terminal system to transmit the required data to the screen transmission device for screen projection or realization of other functions.

In this embodiment, after reading the network information of the screen transmission device through the NFC function, the terminal system directly performs wireless connection with the screen transmission device according to the network information. In the whole connection process, the user only needs to touch the NFC tag with the terminal, which is simple, convenient and rapid.

In an embodiment, after the step of identifying whether the NFC tag contains the network information of the screen transmission device, the method further includes:
  S3, if the NFC tag does not contain the network information of the screen transmission device, sending an acquisition request to the screen transmission device;
  S4, receiving encrypted data fed back by the screen transmission device, wherein the encrypted data is formed by the screen transmission device encrypting its own network information after receiving the acquisition request; and
  S5, writing the encrypted data into the NFC tag.

In this embodiment, if the terminal system identifies that the NFC tag does not contain the network information of the screen transmission device, or that the current NFC tag is a blank tag, it sends an acquisition request to the screen transmission device. Therein, the terminal system establishes a signal channel with the screen transmission device by scanning two-dimensional code information of the screen transmission device for realization of sending the acquisition request and subsequently receiving the data. After startup, the screen transmission device will automatically encrypt its own network information (such as IP, hotspot SSID, password and other characteristic information) with AES128 Encryption algorithm, and then perform Base64 Encoding to form encrypted data. In addition, the screen transmission device enters a monitoring state at any time, and automatically sends the encrypted data to the terminal after listening to the acquisition request sent by the terminal system. After receiving the encrypted data fed back by the screen transmission device, the terminal system writes an encrypted input into the NFC tag through NFC connection, so that when it is necessary to connect with the screen transmission deice next time, the current terminal or other terminals with NFC function can directly acquire the network information of the screen transmission device from the NFC tag, and then establish a signal channel with the screen transmission device.

In an embodiment, the step of writing the encrypted data into the NFC tag includes:
  S501, determining whether the screen transmission device supports NFC according to the encrypted data; and
  S502, if the screen transmission device supports NFC, writing the encrypted data into the NFC tag.

In this embodiment, the encrypted data further includes system version information of the screen transmission device. The terminal system determines whether the screen transmission device currently supports NFC according to the system version information in the encrypted data. If the screen transmission device does not support NFC, it indicates that the system version of the screen transmission device may be too low to get SSID and password of Wi-Fi hotspot. Even if the SSID and password of Wi-Fi hotspot is written into the NFC tag, the terminal cannot connect the hotspot when touching the NFC tag. At this time, it is meaningless even if the encrypted data is written into the NFC tag, so an NFC User Interface (UI) entry is shielded. In an embodiment, the terminal system outputs prompt information to prompt the user to update a latest version of the system of the screen transmission device so as to support NFC.

If the terminal system identifies that the screen transmission device supports NFC, it directly writes the encrypted data into the NFC tag, so that the subsequent terminals can connect with Wi-Fi hotspots by touching the NFC tag, and then set up a local area network and establish a signal channel with the screen transmission device in the same local area network, so as to realize data transmission.

In an embodiment, the step of acquiring the network information, and connecting with the screen transmission device according to the network information includes:
  S201, calling a preset program to analyze the encrypted data, and obtaining the network information; and
  S202, calling the preset program to wirelessly connect with the screen transmission device according to the network information.

In this embodiment, the terminal system needs to decrypt and analyze the encrypted data through the preset program so as to obtain network information. Therein, the preset program can be pre-stored in the terminal system, or stored in a cloud server and downloaded from the cloud server when necessary, which is not specifically limited herein. After obtaining the network information by analysis, the terminal system calls the preset program to establish, according to the characteristic information such as IP, hotspot SSID and password in the network information, a local area network based on Wi-Fi signals with the screen transmission device, and realizes wireless connection with the screen transmission device, which is highly automatic, convenient and rapid.

In an embodiment, the NFC tag includes a first sector and a second sector. The connecting method is applied to a mobile terminal. The step of calling the preset program to analyze the encrypted data, and obtaining the network information includes:
  S2011, reading URL information in the first sector, and identifying the type of an operating system of the mobile terminal;
  S2012, if the type of the operating system is IOS, calling the preset program according to the URL information to analyze the encrypted data; and
  S2013, if the type of the operating system is Android system, reading After Action Review (AAR) package in the second sector, and calling the preset program according to the AAR package to analyze the encrypted data.

In this embodiment, the NFC tag includes a first sector and a second sector, wherein the first sector is the first sector of the NFC tag, and the second sector is the second sector of the NFC tag. According to a format standard of NFC Data Exchange Format (NDEF, that is, data format in the NFC tag agreed by the NFC organization) of NFC data, the first sector needs to be identified first before the second sector can be identified. The first sector of the NFC tag in this embodiment is written with Uniform Resource Locator (URL) information, and the second sector is written with AAR (package name of Android application) package. The terminal system first reads the URL information in the first sector of the NFC tag and identifies the type of the operating system of the terminal system (i.e., the operating system of the mobile terminal). If the type of the current terminal system is iOS, the terminal system identifies whether there is a preset program in the mobile terminal according to rules of iOS. If there is a preset program in the mobile terminal, the preset program is called for open and running through the URL information. If there is no preset program in the mobile terminal, the terminal system jumps to a corresponding cloud server (or download website) through the URL information, and automatically runs the preset program after downloading the preset program from the cloud server, so as to call the preset program to analyze the encrypted data.

If the type of the operating system of the terminal system is Android system, the terminal system skips a verification of the first sector, directly reads the AAR packet in the second sector, and determines whether there is a preset program in the mobile terminal according to the AAR package. If there is no preset program in the mobile terminal, the application store of the mobile terminal is opened to download the preset program corresponding to the AAR package. Then the preset program is directly run to analyze the encrypted data.

In an embodiment, the step of calling the preset program according to the AAR package to analyze the encrypted data includes:
 S20131, determining whether there is the preset program in the mobile terminal according to the AAR package;
 S20132, if there is no preset program in the mobile terminal, opening an application store of the mobile terminal, downloading the preset program corresponding to the AAR package, and using the preset program to analyze the encrypted data; and
 S20133, if there is the preset program in the mobile terminal, running the preset program to analyze the encrypted data.

In this embodiment, the terminal system determines whether there is a preset program in the mobile terminal according to the AAR package (the preset program exists in a form of application software). If there is no preset program in the mobile terminal, the terminal system opens the application store of the mobile terminal, searches the corresponding preset program according to the AAR package and downloads it. After downloading, the preset program is automatically installed, and the preset program is run to analyze the encrypted data. If there is a preset program in the mobile terminal, the terminal system directly opens and runs the preset program, decrypts and analyzes the encrypted data through the preset program, and obtains the required network information.

In an embodiment, after the step of connecting with the screen transmission device according to the network information, the method further includes:
 S6, sending screen projection information to the screen transmission device, so that the screen transmission device projects the screen projection information onto a display screen for playing.

In this embodiment, after the terminal system establishes a signal channel with the screen transmission device according to the network information to realize the connection, the data information (i.e. screen projection information, such as some texts, pictures or images) that needs to be projected is sent to the screen transmission device through the signal channel. After receiving a new screen projection, the screen transmission device will project it to the display screen for playing.

In an embodiment, the screen transmission device may also be a device with other functions. Herein, it is only an example to reflect information transmission between the terminal and the screen transmission device.

Figure 2:
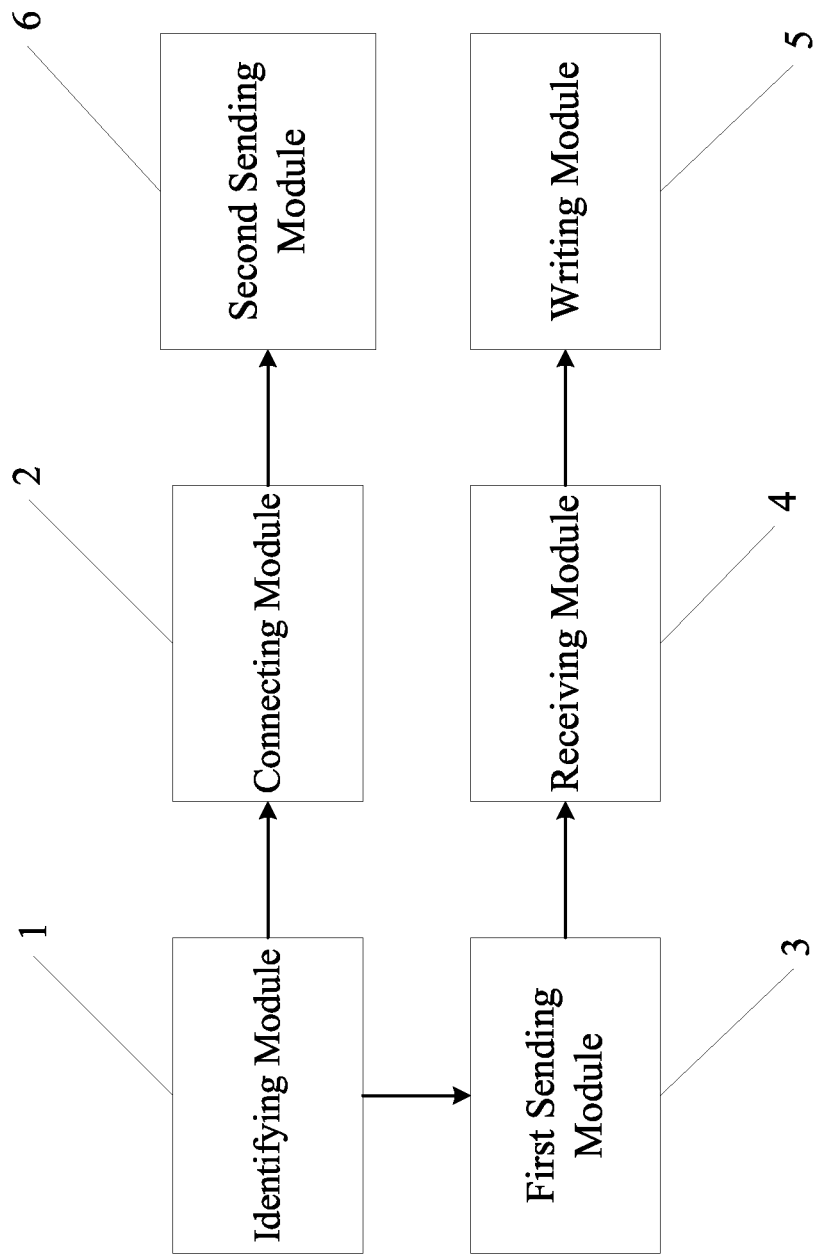
FIG. 2 is a block diagram of an overall structure of a connecting apparatus of a screen transmission device based on NFC according to an embodiment of the present disclosure.

Referring to FIG. 2, an embodiment of the present disclosure further provides a connecting apparatus of a screen transmission device based on NFC. The connecting apparatus includes: an identifying module 1, configured to when an NFC tag is touched, identify whether the NFC tag contains network information of the screen transmission device; and a connecting module 2, configured to, if the NFC tag contains the network information of the screen transmission device, acquire the network information, and connect with the screen transmission device according to the network information.

In an embodiment, the connecting apparatus further includes: a first sending module 3, configured to, if the NFC tag does not contain the network information of the screen transmission device, send an acquisition request to the screen transmission device; a receiving module 4, configured to receive encrypted data fed back by the screen transmission device, wherein the encrypted data is formed by the screen transmission device encrypting its own network information after receiving the acquisition request; and a writing module 5, configured to write the encrypted data into the NFC tag.

In an embodiment, the writing module 5 includes: a determining sub-module, configured to determine whether the screen transmission device supports NFC according to the encrypted data; and a writing sub-module, configured to, if the screen transmission device supports NFC, write the encrypted data into the NFC tag.

In an embodiment, the connecting module 2 includes: an analyzing sub-module, configured to call a preset program to analyze the encrypted data, and obtain the network information; and a connecting sub-module, configured to call the preset program to wirelessly connect with the screen transmission device according to the network information.

In an embodiment, the NFC tag includes a first sector and a second sector. The connecting method is applied to a mobile terminal. The analyzing sub-module includes: a reading unit, configured to read URL information in the first sector, and identify a type of an operating system of the mobile terminal; a first calling unit, configured to, if the type of the operating system is IOS, call the preset program according to the URL information to analyze the encrypted data; and a second calling unit, configured to, if the type of the operating system is Android system, read AAR package in the second sector, and call the preset program according to the AAR package to analyze the encrypted data.

In an embodiment, the second calling unit includes: a determining sub-unit, configured to determine whether there is the preset program in the mobile terminal according to the AAR package; a downloading sub-unit, configured to, if there is no preset program in the mobile terminal, open an application store of the mobile terminal, download the preset program corresponding to the AAR package, and use the preset program to analyze the encrypted data; and an analyzing sub-unit, configured to, if there is the preset program in the mobile terminal, run the preset program to analyze the encrypted data.

In an embodiment, the connecting apparatus includes: a second sending module 6, configured to send screen projection information to the screen transmission device, so that the screen transmission device projects the screen projection information onto a display screen for playing.

In this embodiment, each module, sub-module, unit and sub-unit in the connecting apparatus is configured to perform each step in the connecting method of a screen transmission device based on NFC, and the specific implementation process is not detailed herein.

The present disclosure provides a connecting apparatus of a screen transmission device based on NFC. When a user touches an NFC tag by using a terminal with the NFC function, the terminal system identifies whether the NFC tag contains network information of the screen transmission device. If the NFC tag contains the network information of the screen transmission device, the terminal system acquires the network information and connects with the screen transmission device according to the network information. In the present disclosure, after reading the network information of the screen transmission device through the NFC function, the terminal system directly performs wireless connection with the screen transmission device according to the network information. In the whole connection process, the user only needs to touch the NFC tag with the terminal, which is simple, convenient and rapid.

Figure 3:
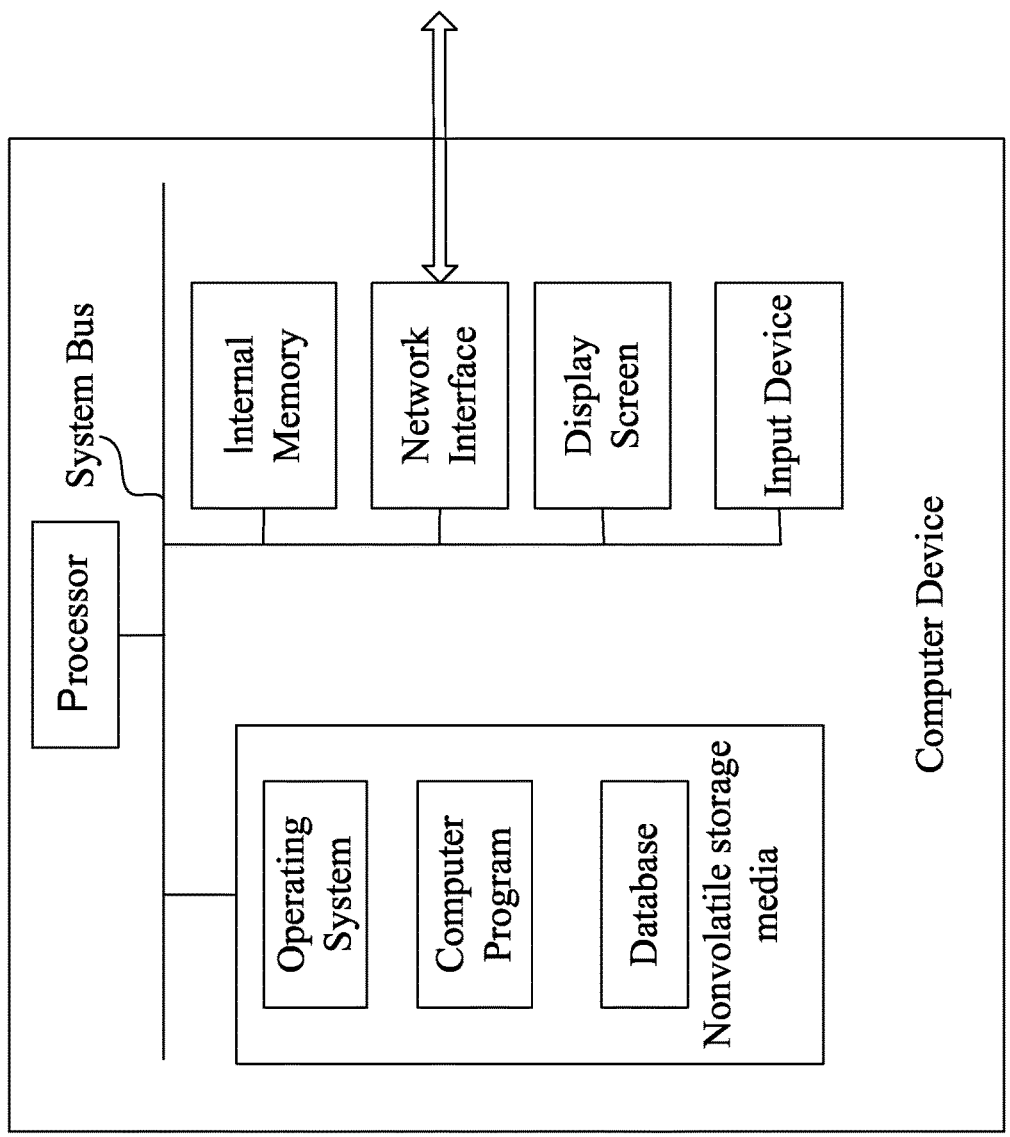
FIG. 3 is a schematic block diagram of a structure of a computer device according to an embodiment of the present disclosure.

Referring to FIG. 3, the embodiment of the present disclosure further provides a computer device, which may be a server, and its internal structure may be as shown in FIG. 3. The computer device includes a processor, a memory, a network interface and a database connected through a system bus. Therein, a processor designed for the computer is configured to provide computing and control capabilities. The memory of the computer device includes a nonvolatile storage medium and an internal memory. The nonvolatile storage medium stores an operating system, a computer program and a database. The internal memory provides an environment for the running the operating system and the computer program in the nonvolatile storage medium. The database of the computer device is configured to store data such as preset programs. The network interface of the computer device is configured to communicate with an external terminal through a network connection. When the computer program is executed by the processor, a connecting method of a screen transmission device based on NFC is realized.

The processor executes the following steps of the above connecting method of a screen transmission device based on NFC.

S1, touching an NFC tag, and identifying whether the NFC tag contains network information of the screen transmission device; and S2, if the NFC tag contains the network information of the screen transmission device, acquiring the network information, and connecting with the screen transmission device according to the network information.

In an embodiment, after the step of identifying whether the NFC tag contains the network information of the screen transmission device, the method further includes:

S3, if the NFC tag does not contain the network information of the screen transmission device, sending an acquisition request to the screen transmission device;

S4, receiving encrypted data fed back by the screen transmission device, wherein the encrypted data is formed by the screen transmission device encrypting its own network information after receiving the acquisition request; and S5, writing the encrypted data into the NFC tag.

In an embodiment, the step of writing the encrypted data into the NFC tag includes:

S501, determining whether the screen transmission device supports NFC according to the encrypted data; and S502, if the screen transmission device supports NFC, writing the encrypted data into the NFC tag.

In an embodiment, the step of acquiring the network information, and connecting with the screen transmission device according to the network information includes:

S201, calling a preset program to analyze the encrypted data, and obtaining the network information; and S202, calling the preset program to wirelessly connect with the screen transmission device according to the network information.

In an embodiment, the NFC tag includes a first sector and a second sector. The connecting method is applied to a mobile terminal. The step of calling the preset program to analyze the encrypted data, and obtaining the network information includes:

S2011, reading URL information in the first sector, and identifying a type of an operating system of the mobile terminal;

S2012, if the type of the operating system is IOS, calling the preset program according to the URL information to analyze the encrypted data; and S2013, if the type of the operating system is Android system, reading AAR package in the second sector, and calling the preset program according to the AAR package to analyze the encrypted data.

In an embodiment, the step of calling the preset program according to the AAR package to analyze the encrypted data includes:

S20131, determining whether there is the preset program in the mobile terminal according to the AAR package;

S20132, if there is no preset program in the mobile terminal, opening an application store of the mobile terminal, downloading the preset program corresponding to the AAR package, and using the preset program to analyze the encrypted data; and S20133, if there is the preset program in the mobile terminal, running the preset program to analyze the encrypted data.

In an embodiment, after the step of connecting with the screen transmission device according to the network information, the method further includes:

S6, sending screen projection information to the screen transmission device, so that the screen transmission device projects the screen projection information onto a display screen for playing.

The present disclosure further provides a computer-readable storage medium, on which a computer program is stored. When the computer program is executed by a processor, a connecting method of a screen transmission device based on NFC is realized. The connecting method of the screen transmission device based on NFC includes:

S1, touching an NFC tag, and identifying whether the NFC tag contains network information of the screen transmission device; and S2, if the NFC tag contains the network information of the screen transmission device, acquiring the network information, and connecting with the screen transmission device according to the network information.

In an embodiment, after the step of identifying whether the NFC tag contains the network information of the screen transmission device, the method further includes:

S3, if the NFC tag does not contain the network information of the screen transmission device, sending an acquisition request to the screen transmission device;

S4, receiving encrypted data fed back by the screen transmission device, wherein the encrypted data is formed by the screen transmission device encrypting its own network information after receiving the acquisition request; and S5, writing the encrypted data into the NFC tag.

In an embodiment, the step of writing the encrypted data into the NFC tag includes:

S501, determining whether the screen transmission device supports NFC according to the encrypted data; and S502, if the screen transmission device supports NFC, writing the encrypted data into the NFC tag.

In an embodiment, the step of acquiring the network information, and connecting with the screen transmission device according to the network information includes:

S201, calling a preset program to analyze the encrypted data, and obtaining the network information; and S202, calling the preset program to wirelessly connect with the screen transmission device according to the network information.

In an embodiment, the NFC tag includes a first sector and a second sector. The connecting method is applied to a mobile terminal. The step of calling the preset program to analyze the encrypted data, and obtaining the network information includes:

S2011, reading URL information in the first sector, and identifying a type of an operating system of the mobile terminal;

S2012, if the type of the operating system is iOS, calling the preset program according to the URL information to analyze the encrypted data; and S2013, if the type of the operating system is Android system, reading AAR package in the second sector, and calling the preset program according to the AAR package to analyze the encrypted data.

In an embodiment, the step of calling the preset program according to the AAR package to analyze the encrypted data includes:

S20131, determining whether there is the preset program in the mobile terminal according to the AAR package;

S20132, if there is no preset program in the mobile terminal, opening an application store of the mobile terminal, downloading the preset program corresponding to the AAR package, and using the preset program to analyze the encrypted data; and S20133, if there is the preset program in the mobile terminal, running the preset program to analyze the encrypted data.

In an embodiment, after the step of connecting with the screen transmission device according to the network information, the method further includes:

S6, sending screen projection information to the screen transmission device, so that the screen transmission device projects the screen projection information onto a display screen for playing.

Those skilled in the art can understand that all or a part of the processes in the method of implementing the above embodiments can be completed by instructing relevant hardware through a computer program, which can be stored in a nonvolatile computer readable storage medium. When the computer program is executed, it can include the processes of the embodiments of the above-mentioned methods. Therein, any reference to memory, storage, database or other media provided in the present disclosure and used in the embodiments may include nonvolatile and/or volatile memory. The nonvolatile memory may include read only memory (ROM), programmable ROM (PROM), electrically erasable programmable ROM (EEPROM), or flash memory. The volatile memory may include random access memory (RAM) or external cache memory. By way of illustration and not limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synch link DRAM (SLDRAM), Rambus direct RAM (RDRAM), Direct Rambus DRAM (DRDRAM), and Rambus Dynamic RAM (RDRAM).

It should also be noted that the terms "include," "comprise," or any other variants thereof are intended to cover non-exclusive inclusion, so that a process, device, first article or method including a series of elements not only includes those elements, but also includes other elements that are not explicitly listed, or also include elements inherent to such processes, devices, first articles or methods. If there are no more restrictions, the element defined by the sentence "including a . . . " does not exclude the existence of other identical elements in the process, device, first article or method that includes the element.

The above is only some embodiments of the present disclosure, and does not limit the claimed scope of the present disclosure. Any equivalent structure or equivalent flow transformation made by using the description and drawings of the present disclosure, or directly or indirectly applied in other relevant technical fields, are also included in the claimed scope of the present disclosure.

What is claimed is:

1. A connecting method of a screen transmission device based on Near Field Communication (NFC), comprising:
    touching an NFC tag, wherein the NFC tag is configured to either contain network information of the screen transmission device or not contain network information of the screen transmission device;
    identifying whether the NFC tag contains network information of the screen transmission device;
    when the NFC tag contains the network information of the screen transmission device, acquiring the network information, and connecting with the screen transmission device according to the network information by calling a preset program to analyze the encrypted data, obtaining the network information, and calling the preset program to wirelessly connect with the screen transmission device according to the network information;
    sending screen projection information to the screen transmission device, so that the screen transmission device projects the screen projection information onto a display screen for playing; and
    when the NFC tag does not contain the network information of the screen transmission device, sending an acquisition request to the screen transmission device for encrypted data of the network information of the screen transmission device, receiving the encrypted data from the screen transmission device, and writing the encrypted data into the NFC tag,
    wherein the encrypted data is formed by the screen transmission device encrypting its own network information after receiving the acquisition request.

2. The connecting method of claim 1, wherein writing the encrypted data into the NFC tag comprises:
    determining whether the screen transmission device supports NFC according to the encrypted data; and when the screen transmission device supports NFC, writing the encrypted data into the NFC tag.

3. The connecting method of claim 1, wherein the NFC tag comprises a first sector and a second sector, the connecting method is performed by a mobile terminal, and calling the preset program to analyze the encrypted data and obtaining the network information comprises:
reading Uniform Resource Locator (URL) information in the first sector, and identifying a type of an operating system of the mobile terminal;
when the type of the operating system is iPhone Operating System (iOS), calling the preset program according to the URL information to analyze the encrypted data; and
when the type of the operating system is Android system, reading After Action Review (AAR) package in the second sector, and calling the preset program according to the AAR package to analyze the encrypted data.

4. The connecting method of claim 3, wherein calling the preset program according to the AAR package to analyze the encrypted data comprises:
determining whether there is the preset program in the mobile terminal according to the AAR package;
when there is no preset program in the mobile terminal, opening an application store of the mobile terminal, downloading the preset program corresponding to the AAR package, and using the preset program to analyze the encrypted data; and
when there is the preset program in the mobile terminal, running the preset program to analyze the encrypted data.

5. A connecting apparatus of a screen transmission device based on Near Field Communication (NFC), comprising:
a memory storing computer-readable instructions; and
a processor coupled to the memory and configured to execute the computer-readable instructions, wherein the computer-readable instructions, when executed by the processor, cause the processor to perform operations comprising:
touching an NFC tag, wherein the NFC tag is configured to either contain network information of the screen transmission device or not contain the network information of the screen transmission device;
identifying whether the NFC tag contains network information of the screen transmission device;
when the NFC tag contains the network information of the screen transmission device, acquiring the network information, and connecting with the screen transmission device according to the network information by calling a preset program to analyze the encrypted data, obtaining the network information, and calling the preset program to wirelessly connect with the screen transmission device according to the network information;
sending screen projection information to the screen transmission device, so that the screen transmission device projects the screen projection information onto a display screen for playing; and
when the NFC tag does not contain the network information of the screen transmission device, sending an acquisition request to the screen transmission device for encrypted data of the network information of the screen transmission device, receiving the encrypted data from the screen transmission device, and writing the encrypted data into the NFC tag,
wherein the encrypted data is formed by the screen transmission device encrypting its own network information after receiving the acquisition request.

6. The connecting apparatus of claim 5, wherein writing the encrypted data into the NFC tag comprises:
determining whether the screen transmission device supports NFC according to the encrypted data; and
when the screen transmission device supports NFC, writing the encrypted data into the NFC tag.

7. The connecting apparatus of claim 5, wherein the NFC tag comprises a first sector and a second sector, the operations are performed by a mobile terminal, and calling the preset program to analyze the encrypted data and obtaining the network information comprises:
reading Uniform Resource Locator (URL) information in the first sector, and identifying a type of an operating system of the mobile terminal;
when the type of the operating system is iPhone Operating System (iOS), calling the preset program according to the URL information to analyze the encrypted data; and
when the type of the operating system is Android system, reading After Action Review (AAR) package in the second sector, and calling the preset program according to the AAR package to analyze the encrypted data.

8. The connecting apparatus of claim 7, wherein calling the preset program according to the AAR package to analyze the encrypted data comprises:
determining whether there is the preset program in the mobile terminal according to the AAR package;
when there is no preset program in the mobile terminal, opening an application store of the mobile terminal, downloading the preset program corresponding to the AAR package, and using the preset program to analyze the encrypted data; and
when there is the preset program in the mobile terminal, running the preset program to analyze the encrypted data.

9. A non-transitory computer-readable medium storing computer-readable instructions, wherein the computer-readable instructions, when executed by a processor, cause the processor to perform operations comprising:
touching a Near Field Communication (NFC) tag, wherein the NFC tag is configured to either contain network information of a screen transmission device or not contain the network information of the screen transmission device;
identifying whether the NFC tag contains network information of the screen transmission device;
when the NFC tag contains the network information of the screen transmission device, acquiring the network information, and connecting with the screen transmission device according to the network information by calling a preset program to analyze the encrypted data, obtaining the network information, and calling the preset program to wirelessly connect with the screen transmission device according to the network information;
sending screen projection information to the screen transmission device, so that the screen transmission device projects the screen projection information onto a display screen for playing; and
when the NFC tag does not contain the network information of the screen transmission device, sending an acquisition request to the screen transmission device for encrypted data of the network information of the screen transmission device, receiving the encrypted data from the screen transmission device, and writing the encrypted data into the NFC tag, wherein the encrypted data is formed by the screen transmission device encrypting its own network information after receiving the acquisition request.

10. The non-transitory computer-readable medium of claim 9, wherein writing the encrypted data into the NFC tag comprises:

determining whether the screen transmission device supports NFC according to the encrypted data; and when the screen transmission device supports NFC, writing the encrypted data into the NFC tag.

11. The non-transitory computer-readable medium of claim 9, wherein the NFC tag comprises a first sector and a second sector, the operations are performed by a mobile terminal, and calling the preset program to analyze the encrypted data and obtaining the network information comprises:

reading Uniform Resource Locator (URL) information in the first sector, and identifying a type of an operating system of the mobile terminal;

when the type of the operating system is iPhone Operating System (iOS), calling the preset program according to the URL information to analyze the encrypted data; and when the type of the operating system is Android system, reading After Action Review (AAR) package in the second sector, and calling the preset program according to the AAR package to analyze the encrypted data.

12. The non-transitory computer-readable medium of claim 11, wherein calling the preset program according to the AAR package to analyze the encrypted data comprises:

determining whether there is the preset program in the mobile terminal according to the AAR package;

when there is no preset program in the mobile terminal, opening an application store of the mobile terminal, downloading the preset program corresponding to the AAR package, and using the preset program to analyze the encrypted data; and when there is the preset program in the mobile terminal, running the preset program to analyze the encrypted data.

* * * * *